No. 788,726. PATENTED MAY 2, 1905.
P. MEDART.
FRICTION CLUTCH.
APPLICATION FILED NOV. 18, 1904.
4 SHEETS—SHEET 2.
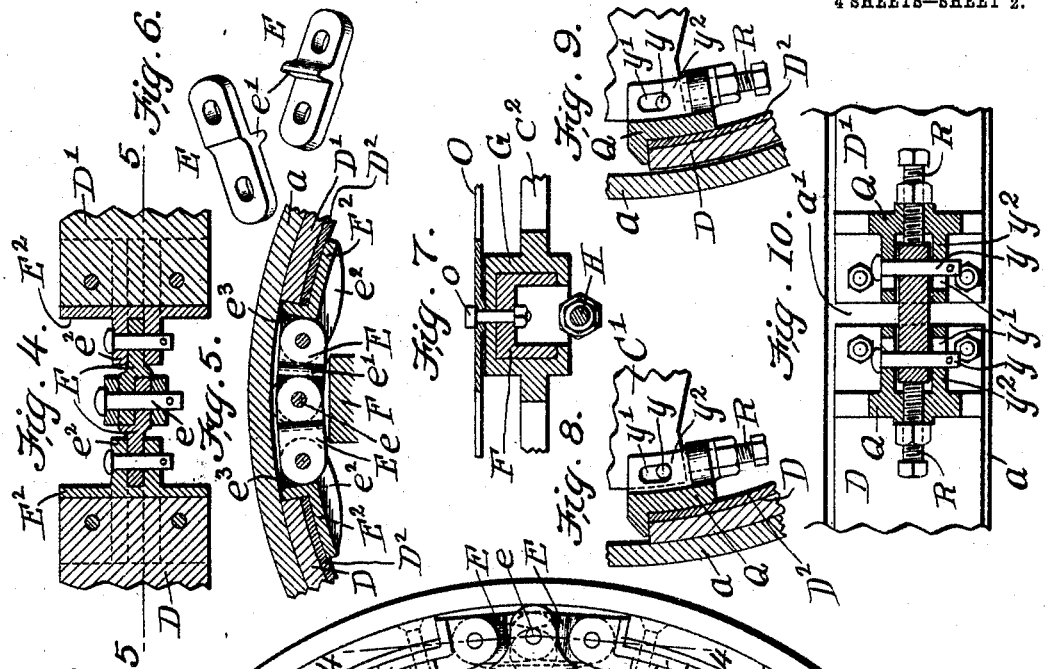
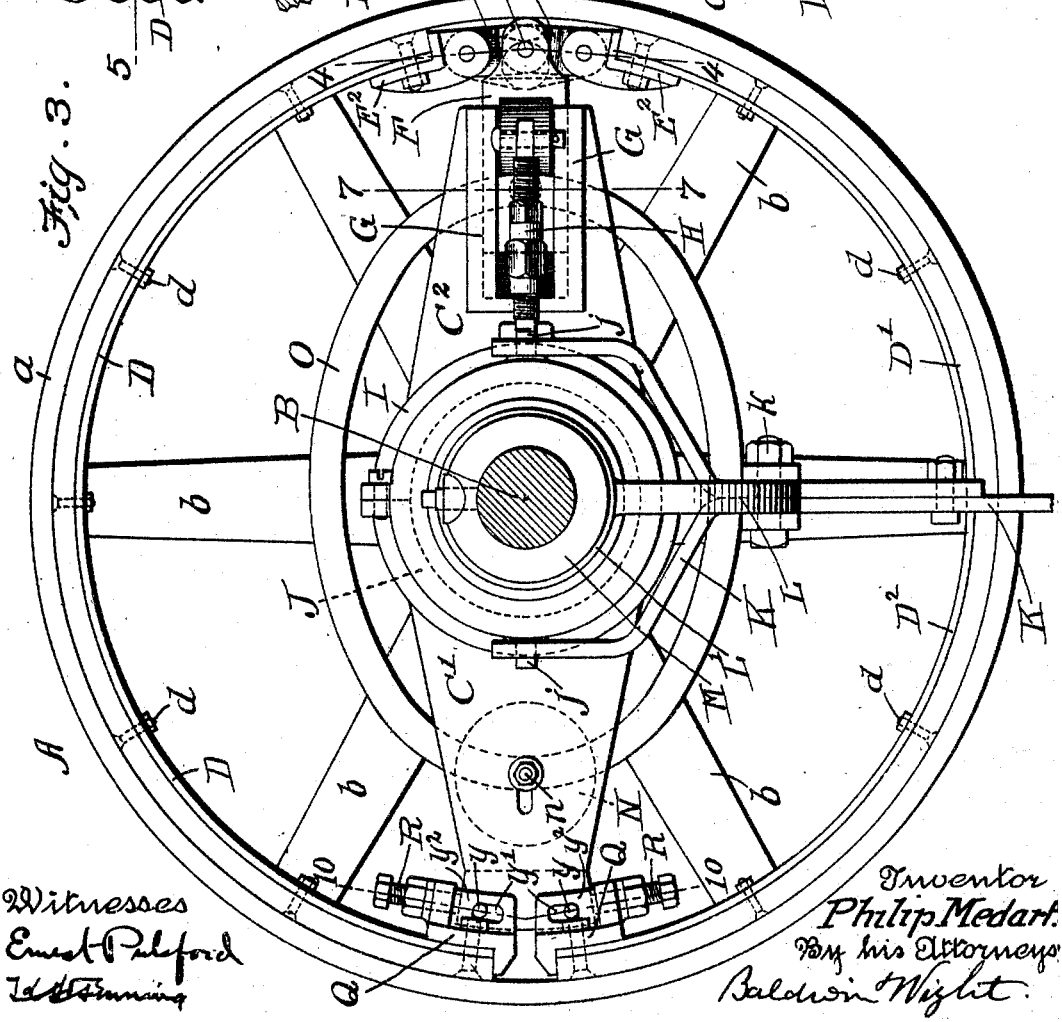
Witnesses
Ernest Pulford
Inventor
Philip Medart.
By his Attorneys
Baldwin Wight

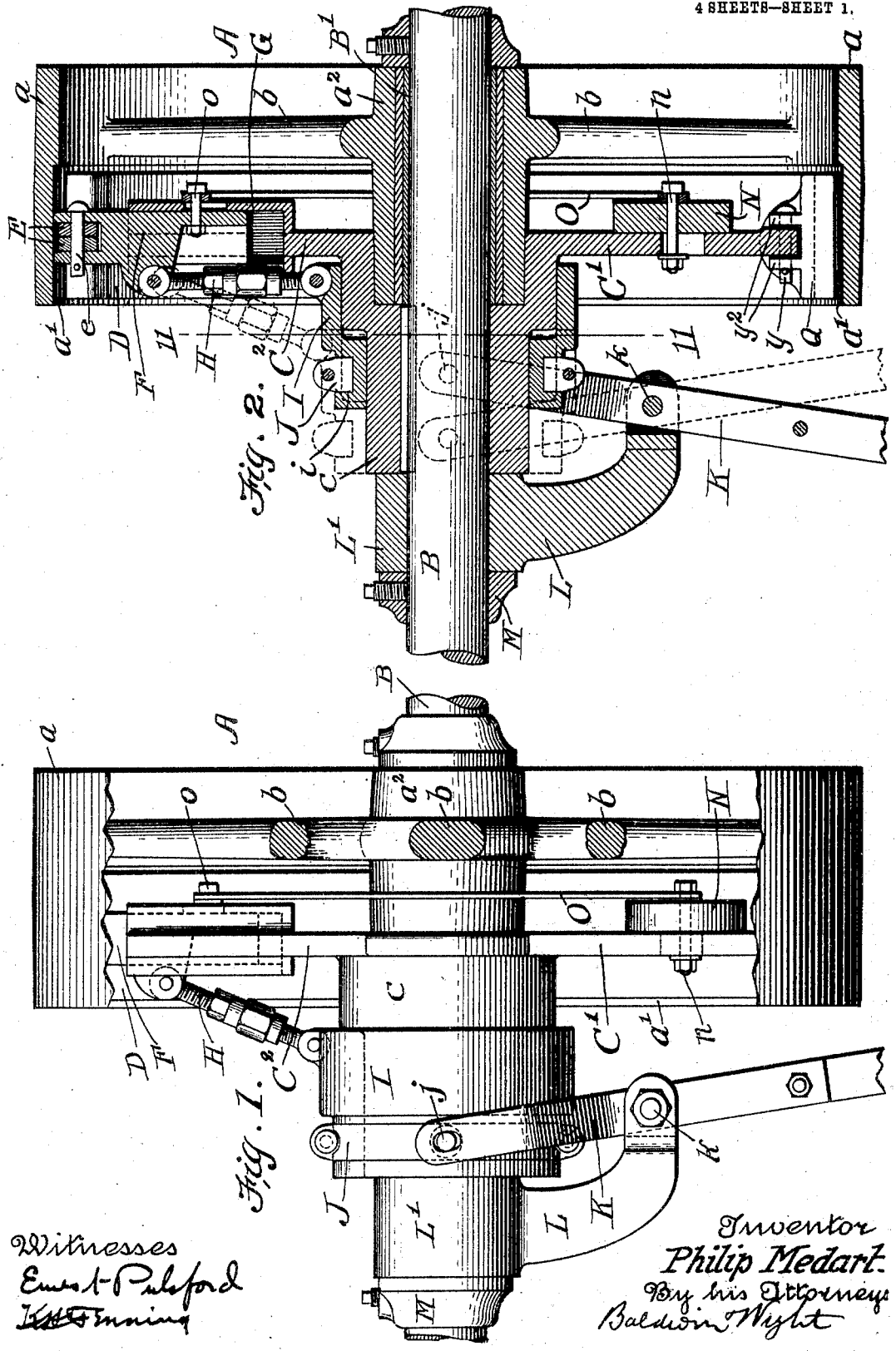

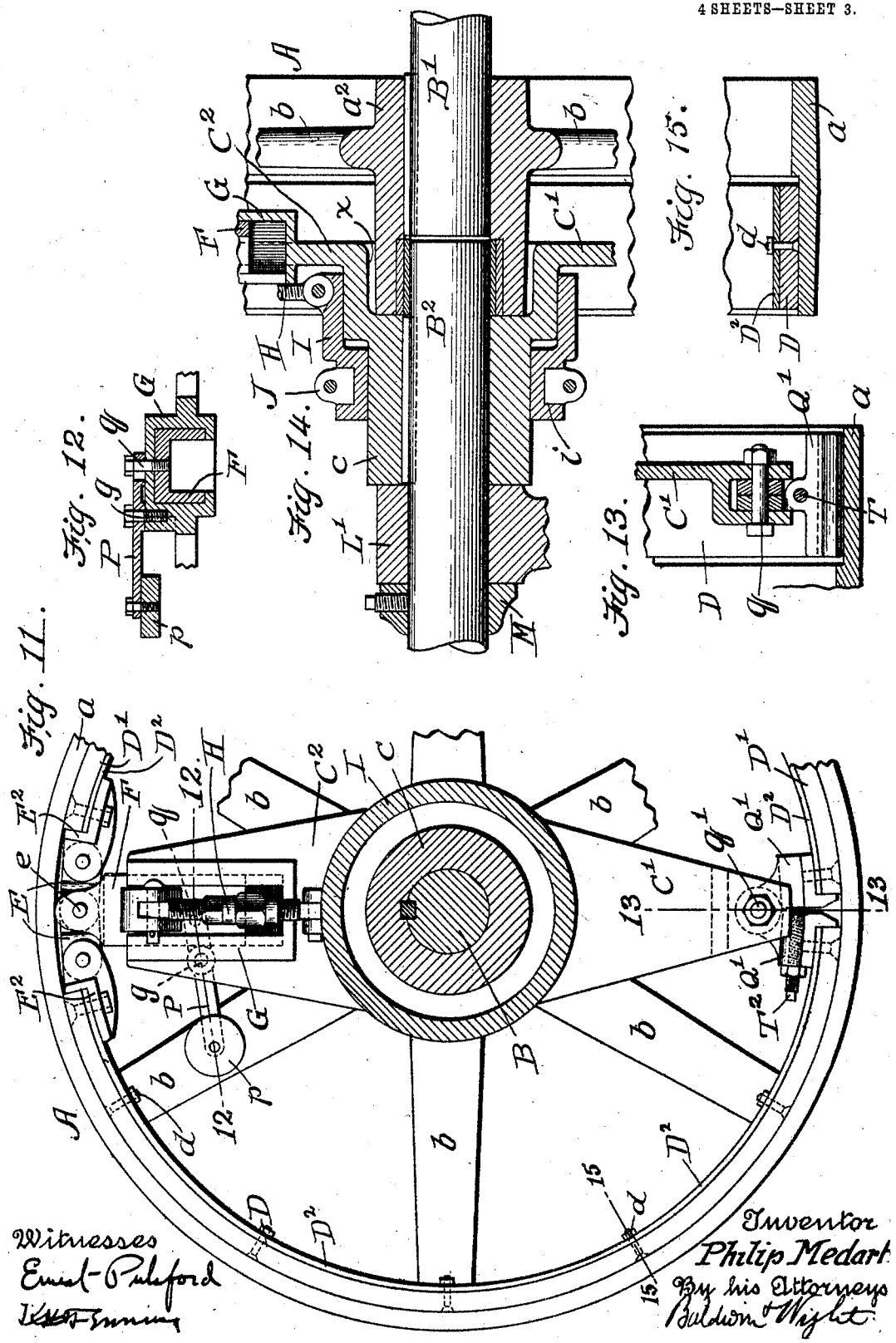

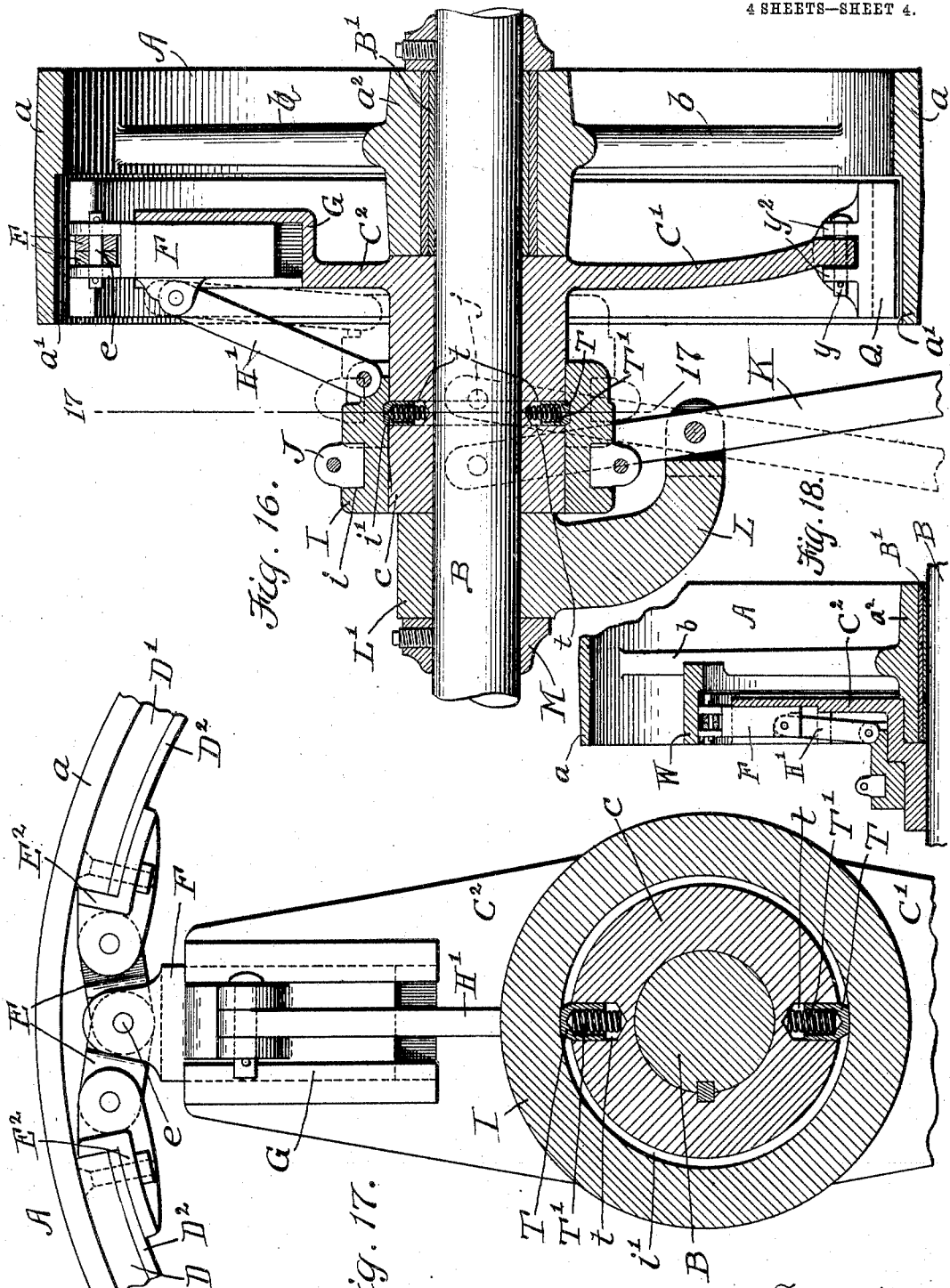

No. 788,726.

Patented May 2, 1905.

UNITED STATES PATENT OFFICE.

PHILIP MEDART, OF ST. LOUIS, MISSOURI, ASSIGNOR OF ONE-HALF TO WILLIAM MEDART, OF ST. LOUIS, MISSOURI.

FRICTION-CLUTCH.

SPECIFICATION forming part of Letters Patent No. 788,726, dated May 2, 1905.

Application filed November 18, 1904. Serial No. 233,361.

*To all whom it may concern:*

Be it known that I, PHILIP MEDART, a citizen of the United States, residing in St. Louis, State of Missouri, have invented certain new and useful Improvements in Friction-Clutches, of which the following is a specification.

My invention relates to that class of friction-clutches in which split rings or segmental shoes are adapted to engage the rim of a pulley or other part to be driven and are expanded and contracted by links connecting the ends of the segments and operated by connection with a sleeve or ring shifted by a shipping-lever; and the object of my invention is to improve the construction of clutches of this character in such manner as to make them more simple, compact, and cheap in construction, more easily adjusted, and more secure and reliable in operation.

I preferably embody my invention in a clutch adapted to connect a band-pulley to a continuously-running line-shaft or in a "friction-coupling" in which the pulley is fast on the driving-shaft and the other clutch member is fast on another shaft placed end to end with the driving-shaft.

In carrying out my invention in the preferred way the pulley is made with a sufficiently wide rim to afford on one side of the spokes or web an annular friction-surface on its inner side, and the length of the hub is made the same as the width of the rim. When the pulley is mounted loosely on the same shaft with the other member of the clutch, the friction-shoes are made in two nearly semicircular wooden segments that are adapted to engage the inner side of the pulley-rim, and at one end each segment is connected with one arm of a supporting-frame that has a hub keyed to the shaft. The other ends of the segments are joined by toggle-links that are pivotally connected with a radially-sliding block connected by an adjustable link with a ring mounted to slide longitudinally of the shaft on the hub of the segment-supporting frame. The ring is shifted by a lever which is fulcrumed on a bracket loosely supported on a shaft, no other support for the lever being required. The toggle-links and the sliding block are so connected that when the block is moved radially outward to expand the segments, and thus apply the clutch, the pivot between the links and the block is moved radially outward beyond the pivotal connections between the segments and the links, by which arrangement the parts are made self-locking, so that the segments are held in close engagement with the pulley without other locking devices. The segments are connected only at their opposite ends with their supporting-frame, and one end of each segment is connected with one arm of the frame in such manner as to have only a slight radial movement, while at the opposite end each segment is connected to the supporting-frame by means of the links and the radially-movable block before referred to. In order to hold the segments in place at these last-mentioned ends, the block is fitted in guides that prevent any sidewise movement of the block or segments. When the clutch members are uncoupled, they should be out of contact with the rim of the pulley, and as they revolve with the shaft the centrifugal force will tend to throw the sliding block outward, and thus close the clutch. In order to prevent this, the block sometimes is connected with a centrifugal compensating weight which may be located on the opposite side of the shaft from the block and connected therewith by an oval frame, or the block may be connected with one end of a lever, the opposite end of which carries a weight which as it flies outward moves the block inward. In this way the accidental or unintentional coupling of the clutch members is avoided. In the case of a friction-coupling this centrifugal weight may be dispensed with, as in that case I mount the pulley on the driving-shaft, while the segments are carried by the shaft to be driven, which is stationary when the segments are withdrawn, and thus no centrifugal action takes place. In the case of pulleys having relatively light work to perform instead of using the centrifugal counterbalancing devices referred to I may use a springactuated locking pin or detent carried by the hub of the segment-supporting frame and adapted when the clutch is uncoupled to engage the sliding ring, which is operated by the shifting-lever. In order to take up wear, the connections between the segments and their supporting-frame at one end are made adjustable by novel devices hereinafter described.

In many clutches of this general class the segments have been wholly made of metal, while in my clutch the friction-surface is made of wood. This I find to be an advantage, inasmuch as the sparking and overheating incident to the use of metal are avoided. I preferably, however, mount the wood segments on thin metal semicircular strips, as in this way I obtain the requisite strength without making the wood segments of undue size.

In constructing my improved clutch I have sought to economize space, and do this by having the mechanism for the most part contained entirely within the rim of the pulley.

In the accompanying drawings, Figure 1 shows a side elevation of my improved friction-clutch with parts broken away in order to better illustrate other parts. In this figure the clutch is uncoupled. Fig. 2 shows a vertical central section of the same with the shaft in elevation and the clutch coupled, the uncoupled position, however, being shown by dotted lines. Fig. 3 shows a side elevation of the mechanism. Fig. 4 is a detail view in section on the line 4 4 of Fig. 3, illustrating particularly the arrangement of the toggle-links. Fig. 5 is another detail view of the toggle-links and their connections. Fig. 6 is a perspective view of the links. Fig. 7 shows a local section on the line 7 7 of Fig. 3 and illustrates particularly the manner in which the radially-sliding block is guided. Figs. 8 and 9 are detail views of the connections between the segment-supporting frame and the ends of the segments opposite to those connected by the links. Fig. 8 shows the position of the parts when the segments are expanded, and Fig. 9 shows their position when contracted. Fig. 10 shows a section on the line 10 10 of Fig. 3. Fig. 11 shows a side elevation of a modification. Parts are in section and parts are broken away. Fig. 12 shows a section on the line 12 12 of Fig. 11 and illustrates particularly the connection between the radially-sliding block and the centrifugal compensating weight, which in this case is carried by a short pivotal lever. Fig. 13 shows a section on the line 13 13 of Fig. 11, illustrating a modified way of connecting the segments with the segment-supporting frame at the ends opposite to those connected by the toggle-links. Fig. 14 is a detail view in section, showing a friction-coupling embodying my improvements. Fig. 15 is a local section on the line 15 15 of Fig. 11. Fig. 16 shows a vertical longitudinal section of a pulley and clutch constructed in accordance with my invention in which the centrifugal counterbalancing devices are dispensed with and a locking-pin is employed for holding the segments away from the pulley when the clutch is uncoupled. Fig. 17 shows a vertical transverse section on the line 17 17 of Fig. 16. Fig. 18 shows a modification.

I will first describe my invention as applied to a clutch adapted to connect a loose pulley with a clutch member fast on the driving-shaft and will first refer to the construction shown in Figs. 1 to 10, inclusive. The pulley A is mounted loosely on the driving-shaft B. It has a rim $a$ projecting from opposite sides of the spokes $b$ and is preferably slightly wider on one side than on the other and is suitably finished to form an annular friction-surface $a'$ on the inner side of the rim. The length of the hub $a^2$ is preferably made the same as the width of the rim and extends in opposite directions from the spokes, so as to provide a wide bearing that will hold the pulley steady and prevent wear incident to wabbling. Babbitt metal $B'$ is preferably interposed between the pulley-hub and the shaft, so that the shaft may revolve freely within the hub when the pulley is uncoupled. It will thus be seen that the pulley is of usual or well-known construction. Substantially no change need be made in ordinary pulleys to apply my improved clutch, except that a suitable friction-surface $a'$ is provided. To the shaft B is rigidly secured a frame consisting of a hub $c$ and two radial arms $C'$ $C^2$. This frame serves to support on the driving-shaft the segmental friction-shoes D D', which form nearly a complete ring within the rim of the pulley. They are normally out of contact with the rim of the pulley, but are adapted to bear against the friction-surface $a'$ thereof when they are expanded. The segments D D' may be made entirely of wood, but preferably they are backed by metal strips $D^2$, secured to the wooden strips or segments by bolts $d$. At one end each segment is connected with the arm $C'$ of the segment-supporting frame, and the opposite end of each segment is pivotally connected with a link E, which latter are pivotally connected with each other in the manner illustrated in Figs. 3, 4, and 5, and each link is also pivotally connected by the same pin $e$ with a radially-sliding block F, which is mounted to slide in guides G, formed in the arm $C^2$ of the segment-supporting frame. These guides are such, as indicated particularly in Fig. 7, that while the block F is free to move radially it is prevented from moving sidewise or in any other direction. In this way the segments are prevented from moving sidewise relatively to the pulley-rim on one side of the shaft, while they are prevented from moving in a similar way on the opposite side of the shaft by the devices hereinafter described. The block F is connected by a link H with a sliding collar I, adapted to move longitudinally on the hub $c$ of the segment-supporting frame. The link H is adjustable by the devices shown, which are of well-known construction and need not be described in detail.

The collar I is formed with an annular groove $i$, in which is arranged a ring J, having studs $j$ connected with a forked operating-lever K, which is pivoted at $k$ to an arm or bracket L, projecting from a hub L', surrounding the shaft B loosely. This hub is held in place between the hub $c$ and a collar M, fixed to the shaft. The lever hangs from the shaft and is supported in no other way. By operating this lever the block F may be moved radially inward or outward to uncouple or couple the clutch. When the block is moved outward, the toggle-links E have their adjacent ends, which are connected with block, moved radially outward, and thus the segments are spread apart and are thereby made to engage the pulley-rim. It will be observed that the toggle-links are arranged between the ends of the segments and that the thrust which they impart is directly against the ends thereof. It will also be observed that when the block is moved outward its pivotal connection with the toggles moves beyond the pivotal connections between the toggles and the segments. In this way the parts are made self-locking, and it is also to be observed that by reason of this construction no special means need be provided for locking the operating-lever, as the devices just described also serve to hold this lever in the place to which it is set. Each toggle-link is formed with a shoulder $e'$, having a straight flat surface against which the inner end of the other link bears. The adjacent ends of the segments are armed with caps $E^2$, having lugs $e^2$, to which the links are pivoted. These caps have flat faces $e^3$, against which the outer ends of the links bear. By this arrangement when the links are straightened out the strain is taken off from the pivot-pins and a more powerful and durable construction is afforded. When the clutch is uncoupled and the segments are revolving with the driving-shaft, there is a tendency for the block F to fly outward by centrifugal force and to thus apply the friction-clutch. In order to prevent this, I employ a compensating device, which in Figs. 1, 2, and 3 is shown as consisting of a weight N, attached by a bolt $n$ to an oval frame O, surrounding the driving-shaft and connected at its opposite end by a bolt $o$ with the block F. This weight is just sufficient to counterbalance the weight of the block F and the parts connected therewith which tend to fly out by centrifugal force and effectively prevent such centrifugal action.

Instead of employing the weight N and the parts connected therewith I may employ a lever P, carrying a weight $p$ and jointed at $q$ to the block F, the lever being pivoted at $g$ on the guide G, as illustrated in Figs. 11 and 12.

In Fig. 2 the pulley is shown as mounted loosely on the same shaft as the friction-segments and the hub of the pulley is made to project into the hub $c$ of the segment-supporting frame, in which it is shown as making rather a close fit. When, however, my improvements are embodied in a friction-coupling, the pulley is keyed to a shaft B' in the manner indicated in Fig. 14, while the other member of the coupling is keyed to another shaft, $B^2$. When this is the case, the hub $c$ should not fit the pulley-hub closely, but should be recessed at $x$ in the manner indicated.

The means for adjusting the segments at their ends opposite the toggle-links is also of importance. As shown, a casting Q is attached to the end of each segment and carries an adjusting-screw R, which engages the arm C' of the frame C. Each casting is connected with a segment in the manner particularly illustrated in Figs. 8 to 10 by means of a bolt or pin $y$, which is rigidly connected to the frame C' and which extends through elongated slots $y'$ in the ears $y^2$ of the casting. It will be observed that the slots $y'$ are somewhat wider than the diameter of the pins $y$, so that there is a slight freedom of movement, whereby when the toggle-links are loosened and the strain on the segments relieved at one end the strain is also relieved at the opposite end; but when the toggle-links are tightened the opposite ends of the segments are made to firmly engage the pulley—that is to say, when the clutch is uncoupled the friction shoes or segments are entirely withdrawn from the rim of the pulley throughout their entire length, but when the clutch is coupled they are made to engage the pulley-rim at all points. Fig. 8 shows the position of the parts when the clutch is coupled, and Fig. 9 shows the uncoupled positions. As the segments wear away they may be adjusted to any desired extent by means of the set-screws R, no adjustment of the opposite ends of the segments being required, this being undesirable, as it is important that the block F should be moved radially to a sufficient extent only to cause the pin $e$ to pass to the proper extent beyond the pivots of the toggle-links.

Instead of the arrangement shown in Fig. 3 I may employ the arrangement shown in Fig. 11, where the ends of the segments are connected with castings Q', pivotally connected by a single bolt $q'$ with the arm C', and a single adjusting-screw T is employed. Other changes in the details of construction may be made without departing from the novel devices of my invention.

The centrifugal devices before described are preferably only employed when the pulley has heavy duty to perform, although they may be employed in all pulleys; but to simplify the construction and for use on small pulleys or those having light work I may use the devices shown in Figs. 16 and 17. Many of the parts there illustrated are similar to those before described, and shown in preceding figures of the drawings. These parts are similarly lettered. The link H' is in this instance shown as non-adjustable. The centrifugal devices are entirely omitted and the hub c of the segment-supporting frame is shown as formed with radial recesses t, in which are mounted to slide radially the pins T, which are pressed outward by springs T'. The ring I is formed on its inner side with an annular groove i'', with which the pins T are adapted to engage when the clutch is uncoupled, as indicated in Fig. 16. When the pins thus engage, the centrifugal force is insufficient to cause the segments to expand against the holding power of the pins. The outer ends of the pins are slightly tapered and the walls of the groove i'' are similarly tapered, so that the collar I may be moved longitudinally on the hub c by the lever K, which will transmit sufficient power to cause the pins to be moved radially inward against the force of the springs, the inclinations on the pins being such as to permit this when the force of the lever is exerted, although the centrifugal force transmitted through the link H' is never sufficient to move the pins. These devices just described are much simpler than those before explained.

Instead of causing the segments to engage the rim of the pulley I may cause them to engage a friction-ring smaller in diameter than the pulley. In Fig. 18 I show a construction in which a friction-ring W is attached to the spokes of the pulley, while the segments and other parts connected therewith are made of a proper size and construction to conform to this arrangement. I may use such a friction-ring on pulleys of large diameter and narrow face.

I claim as my invention—

1. A friction clutch or coupling comprising a driving and a driven part, one of said parts comprising two expansible segments, a segment-supporting frame to which they are adjustably connected at one end to compensate for wear, toggle-links interposed in the space between the opposite ends of the segments, a radially-moving block pivotally connected with the links and means for moving the block radially to cause its pivotal connection with the links to pass radially beyond the pivotal connections between the links and segments.

2. A friction clutch or coupling comprising a driving and a driven part one of which comprises two expansible segments, a segment-supporting frame to which they are adjustably connected at one end to compensate for wear and confined against sidewise movement, toggle-links interposed in the space between the opposite ends of the segments, a radially-moving block pivotally connected with the links, means for guiding the block and for preventing sidewise movement thereof and means for moving the block radially to cause its pivotal connection with the links to pass radially beyond the pivotal connections between the links and the segments.

3. A friction clutch or coupling comprising a driving and a driven part one of said parts comprising expansible segments, a segment-supporting frame to which they are connected at one end, toggle-links interposed between the opposite ends of the segments and having straight, flat bearing-surfaces to take the strain from the pivots when the links are straightened out, a radially-moving block pivotally connected with the links and means for moving the block radially to cause its pivotal connection with the links to pass radially beyond the pivotal connection between the links and the segments.

4. A friction clutch or coupling comprising a driving and a driven part, one of said parts comprising two expansible segments, a segment-supporting frame to which they are adjustably connected at one end to compensate for wear, toggle-links interposed between the opposite ends of the segments and pivotally connected therewith, a radially-moving block pivotally connected with the links, a sliding ring, a lever connected with the ring, an arm or bracket loosely supported on the shaft to which the lever is fulcrumed and a link connecting the ring with the radially-moving block and which causes the pivotal connection between the block and the toggle-links to pass radially beyond the pivotal connection between the links and the segments.

5. A friction clutch or coupling comprising a driving and a driven part, one of said parts comprising expansible segments, a segment-supporting frame, means for expanding and contracting the segments at one end and means for adjusting the segments at the opposite ends comprising castings secured to the segments having widened elongated slots, pins projecting from the segment-supporting frame and extending through the slots, and bolts carried by the castings and engaging the segment-supporting frame.

6. The combination with a pulley-rim of two expansible segmental shoes normally out of contact with the rim, a segment-supporting frame, toggle-links connected with adjacent ends of the segments, means for operating the toggle-links to expand and contract the segments, loose or movable connections between the opposite ends of the segments and the segment-supporting frame which when the segments are contracted hold the adjacent ends away from the pulley-rim but which when the segments are expanded, permit them to engage the rim and means for adjusting the said connections between the adjacent ends of the segments and the segment-supporting frame at their ends opposite to those connected with the toggle-links.

7. A friction clutch or coupling comprising a driving and a driven part, one of said parts comprising two expansible segments or half-rings, a segment-supporting frame to which the two adjacent ends of the half-rings are loosely connected so that they have a slight movement, toggle-links interposed between the opposite ends of the segments and pivotally connected therewith, a radially-moving block pivotally connected with the links, means for moving said block radially to straighten the links and thus expand the segments, and means for adjusting the distance between the opposite ends of the segments independent of the operating means for expanding the clutch.

8. The combination with a pulley-rim of expansible segments adapted to engage therewith, a segment-supporting frame to which the segments are connected at one end, toggle-links connected with the opposite ends of the segments, a radially-moving block connected with the links, a centrifugal compensating weight on the opposite side of the shaft and a frame connecting the block and the weight whereby the tendency for the block to move radially outward by centrifugal force is prevented.

9. A friction clutch or coupling comprising a driving and a driven part, one of said parts comprising two expansible segments composed of metal strips and wooden friction-surfaces, a segment-supporting frame to which the expansible segments are adjustably connected at one end to compensate for wear, toggle-links interposed in the space between the opposite ends of the segments, a radially-moving block pivotally connected with the links and means for moving the block radially to cause its pivotal connection with the links to pass radially beyond the pivotal connection between the links and the segments.

10. A friction clutch or coupling comprising a driving and a driven part, one of said parts comprising expansible segments, a segment-supporting frame to which they are connected at one end, toggle-links interposed between the opposite ends of the segments, a radially-moving block pivotally connected with the links, a sliding collar having a linked connection with the radially-moving block and a spring locking-pin for holding the sliding block against movement when the clutch is uncoupled.

In testimony whereof I have hereunto subscribed my name.

PHILIP MEDART.

Witnesses:
ARTHUR HILL,
A. Y. RUSSEL.